US009800920B2

(12) United States Patent
Lee et al.

(10) Patent No.: US 9,800,920 B2
(45) Date of Patent: Oct. 24, 2017

(54) DISPLAY DEVICE (71) Applicant: SAMSUNG ELECTRONICS CO., LTD., Suwon-si (KR)

(72) Inventors: Sang Jun Lee, Yongin-si (KR); Ki Suk Kim, Suwon-si (KR); Hyun Kyu Yun, Seoul (KR); Jee-Hoon Ka, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/877,224

(22) Filed: Oct. 7, 2015

(65) Prior Publication Data

US 2016/0156956 A1 Jun. 2, 2016

(30) Foreign Application Priority Data

Dec. 2, 2014 (KR) ........................ 10-2014-0170122

(51) Int. Cl.
*H04N 21/41* (2011.01)
*H04N 21/422* (2011.01)
*H04N 21/4363* (2011.01)
*G06F 3/14* (2006.01)

(52) U.S. Cl.
CPC ....... *H04N 21/4122* (2013.01); *G06F 3/1454* (2013.01); *H04N 21/422* (2013.01); *H04N 21/43637* (2013.01); *G06F 3/1438* (2013.01); *G09G 2320/0261* (2013.01); *G09G 2370/042* (2013.01)

(58) Field of Classification Search
CPC ....... G06F 3/1423; G06F 3/1454; H04N 9/67; H04N 21/4122; H04N 21/422; H04N 21/436637
See application file for complete search history.

(56) References Cited

U.S. PATENT DOCUMENTS

| 2003/0028888 | A1  |    | 2/2003  | Hunter et al.            |
|--------------|-----|----|---------|--------------------------|
| 2003/0078966 | A1  | *  | 4/2003  | Kinjo ............ G06F 3/1423 |
|              |     |    |         | 709/203                  |
| 2003/0088880 | A1  | *  | 5/2003  | Martinez ...... H04N 7/17318 |
|              |     |    |         | 725/133                  |
| 2007/0091168 | A1  |    | 4/2007  | Lee                      |
| 2010/0136958 | A1  | *  | 6/2010  | Chandra ........ H04L 65/4084 |
|              |     |    |         | 455/414.3                |
| 2010/0146560 | A1  | *  | 6/2010  | Bonfrer ........ H04N 21/43637 |
|              |     |    |         | 725/62                   |
| 2010/0269127 | A1  | *  | 10/2010 | Krug ................ H04H 60/33 |
|              |     |    |         | 725/18                   |
| 2014/0232614 | A1  | *  | 8/2014  | Kunkel .............. H04N 9/67 |
|              |     |    |         | 345/1.1                  |
| 2016/0007158 | A1  | *  | 1/2016  | Venkatraman ...... H04W 4/023 |
|              |     |    |         | 455/456.2                |

FOREIGN PATENT DOCUMENTS

JP          2007-74056          3/2007

* cited by examiner

*Primary Examiner* — Sumaiya A Chowdhury
(74) *Attorney, Agent, or Firm* — Staas & Halsey LLP

(57) ABSTRACT

A display device, which includes a mobile display which is paired and connected with a main display, receives and stores main image information transmitted from the main display, and when its own motion is detected, continuously displays an image being displayed on the main display based on the main image information.

5 Claims, 10 Drawing Sheets

DISPLAY DEVICE

CROSS-REFERENCE TO RELATED APPLICATION

This application claims the benefit of Korean Patent Application No. 10-2014-0170122, filed on Dec. 2, 2014 in the Korean Intellectual Property Office, the disclosure of which is incorporated herein by reference.

BACKGROUND

1. Field

Embodiments relate to a display device.

2. Description of the Related Art

As display devices are for visibly and three-dimensionally displaying image information, recently, weights and volumes thereof, and weak points of cathode ray tubes (CRTs), have been reduced. Therefore, flat display devices with excellent performance in various ways, such as small limits for installation spaces, easy implementation for images of large screens, easy planarization, high quality, etc., have been developed.

Typical examples for the flat display devices are liquid crystal display (LCD) devices, electro-luminescence display (ELD) devices, field emission display (FED) devices, and plasma display panel (PDP) devices, thin film transistor LCD (TFT-LCD) devices, flexible display devices, organic light-emitting diode (OLED) displays, etc.

In the case of televisions installed in homes among the above-described displays, most of them are positioned in a living room so that all members of a family can watch the television. Further, in many cases, one family has several televisions positioned in each room instead of just the living room.

Meanwhile, inventors have been searching for various methods to increase the convenience of users who watch the televisions.

SUMMARY

Therefore, it is an aspect of the embodiments to provide a display device.

Additional aspects of the embodiments will be set forth in part in the description which follows and, in part, will be obvious from the description, or may be learned by practice of the embodiments.

In accordance with one aspect of the embodiments, a display device includes a mobile display which includes a motion sensor for detecting movement, is paired and connected with a main display, receives and stores main image information transmitted from the main display, and when its own motion is detected, continuously displays an image being displayed on the main display based on the main image information, wherein the mobile display recognizes as motion detection when any one of a change of its own position, image sway, a change in ambient sound, and a combination thereof is detected through the motion sensor.

The main image information may include data of the image being displayed on the main display and image output information having at least one of a channel, volume, a current playback time, a playback position, and a combination thereof of the image being displayed on the main display.

The mobile display may continuously display the image being displayed on the main display based on the current playback time or the playback position when the image is continuously displayed.

When the mobile display includes a set-top box for receiving an external image, the main image information may include image output information having at least one of a channel, volume, a current playback time, a playback position, and a combination thereof of the image being displayed on the main display.

The mobile display may continuously display the image being displayed on the main display, simultaneously output a message determining whether the image being displayed on the main display is to be continuously displayed or not, and control whether the image is to be continued or not according to user's selection.

The mobile display may include an on/off controller which outputs a message determining whether a screen of the main display is to be off or not after the image being displayed on the main display is continued on the mobile display, and controls the main display according to user's selection.

The mobile display may include a watching information transceiver which transmits mobile image information including at least one of a channel, volume, a current playback time, a playback position, and a combination thereof of a current image being displayed thereon to the main display.

Further, the display device may further include a docking station configured to mount the mobile display, wherein a case in which the mobile display is separated from the docking station in a state connected through connection terminals there between may be recognized as the motion detection.

In accordance with another aspect of the embodiments, a display device includes a main display which includes a proximity sensor for detecting an object there around, is paired and connected with a mobile display, and transfers main image information on an image being displayed thereon to the mobile display, wherein the main display continuously displays the image being displayed thereon on the mobile display, receives mobile image information transmitted from the mobile display, and when the proximity sensor detects that the mobile display approaches the main display, the image being displayed on the mobile display is continued on the main display.

The main display may continuously display the image being displayed on the mobile display and simultaneously output a message determining whether the image being displayed on the mobile display is to be continued or not, and control whether the image is to be continued or not according to user's selection.

The main display may include an on/off controller which outputs a message determining whether a screen of the mobile display is to be off or not after the image being displayed on the mobile display is continued on the main display, and control the mobile display according to user's selection.

The main image information may include data of the image being displayed on the main display and image output information including at least one of a channel, volume, a current playback time, a playback position, and a combination thereof of the image being displayed on the main display.

The mobile display may include a set-top box for receiving an external image, the main image information includes image output information having at least one of a channel, volume, a current playback time, a playback position, and a combination thereof of the image being displayed on the main display.

The mobile display may include a watching information transceiver which transmits mobile image information including at least one of a channel, volume, a current playback time, a playback position, and a combination thereof of the current image being displayed thereon to the main display.

The main display may include a tuner or set-top box for receiving the external image.

BRIEF DESCRIPTION OF THE DRAWINGS

These and/or other aspects of the embodiments will become apparent and more readily appreciated from the following description of the embodiments, taken in conjunction with the accompanying drawings of which.

DETAILED DESCRIPTION

Hereinafter, exemplary embodiments of the embodiments will be described in detail with reference to the accompanying drawings. Additional objects, features and operational advantages, including the object, constitution and effects of the embodiments, will become more apparent from the detailed description of the preferred embodiments. In this specification, when reference numerals are assigned to components of each drawing, it should be noted that, although the same components are illustrated in different drawings, the same numerals are assigned as much as possible. Further, in the following description of the embodiments, a detailed description of known functions and configurations incorporated herein will be omitted when it may make the subject matter of the embodiments rather unclear. It will be understood that, although the terms "first," "second," etc. may be used herein to describe various components, these components should not be limited by these terms.

Hereinafter, exemplary embodiments will now be described more fully with reference to the accompanying drawings.

Figure 1:
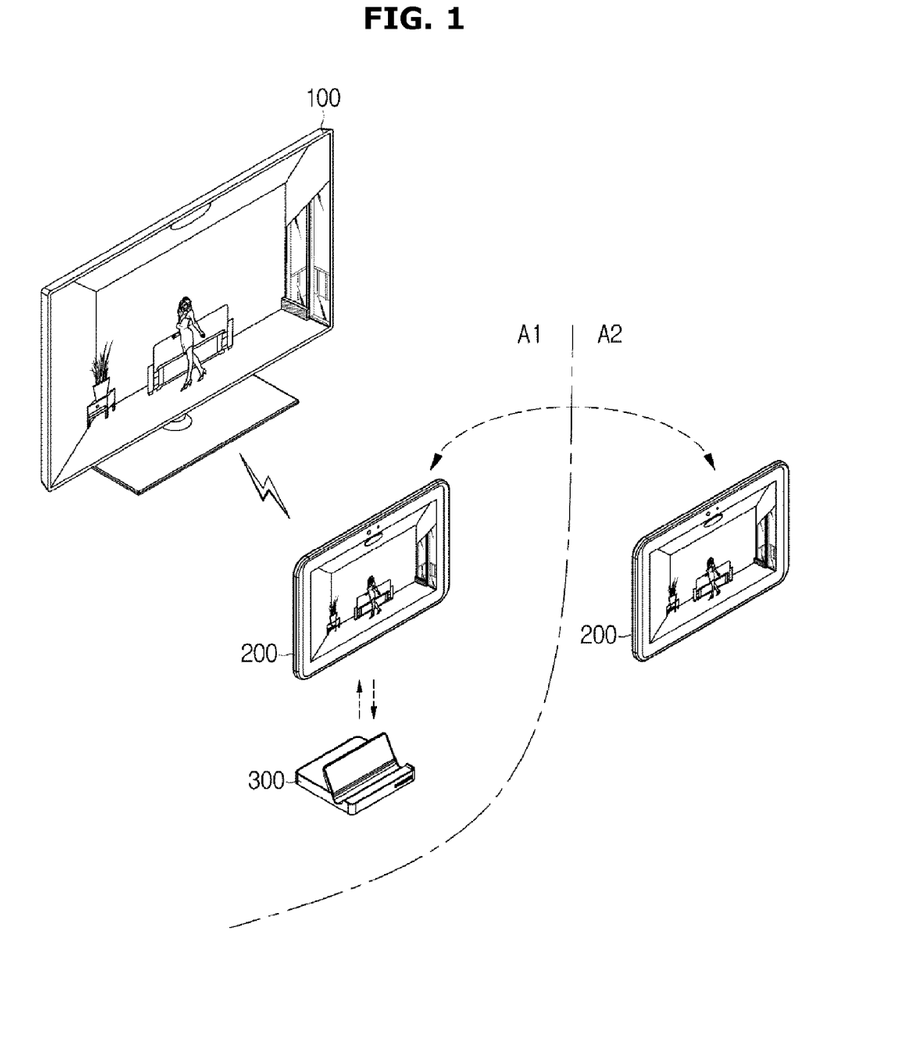
FIG. 1 is a view illustrating a connection relation of display devices according to one embodiment.

FIG. 1 is a view illustrating a connection relation of display devices according to one embodiment.

As shown in FIG. 1, the display devices may include a main display 100 which is paired and connected with a mobile display 200 and transfers main image information on an image being displayed on the main display 100 to the mobile display 200.

Further, the display devices may include the mobile display 200 which is paired and connected with the main display 100, receives and stores the main image information transmitted from the main display 100, and continuously displays the image being displayed on the main display 100 based on the main image information when its own motion is detected.

The pairing connection between the main display 100 and the mobile display 200 is in a state in which information therein may be exchanged by connecting through near field communication (NFC), such as Bluetooth, and thus identifying information may be exchanged for securely identifying and transceiving data.

Further, the main image information may include image output information including data of the image being displayed on the main display 100 and at least one of a channel, volume, a current playback time, a playback position, and a combination thereof of the image being displayed on the main display 100.

When the mobile display 200 includes a set-top box for receiving an external image, the main image information may include image output information including at least one of the channel, the volume, the current playback time, the playback position, and the combination thereof of the image being displayed on the main display 100. That is, when the mobile display 200 may receive an image by itself, an additional procedure for transmitting image data is omitted.

As shown in FIG. 1, the main display 100 and the mobile display 200 are positioned in a region A1 (e.g., a living room), and then when the mobile display 200 is moved to another region A2 (e.g., a room), the mobile display 200 may continuously display the image being displayed on the main display 100. As a result, a user may naturally and continuously watch the image being displayed on the main display 100 through the mobile display 200.

At this time, the mobile display 200 includes a motion sensor to detect its own movement, and movement into another region A2 may be recognized when the movement is detected. The movement detection method is not limited thereto.

Figure 2:
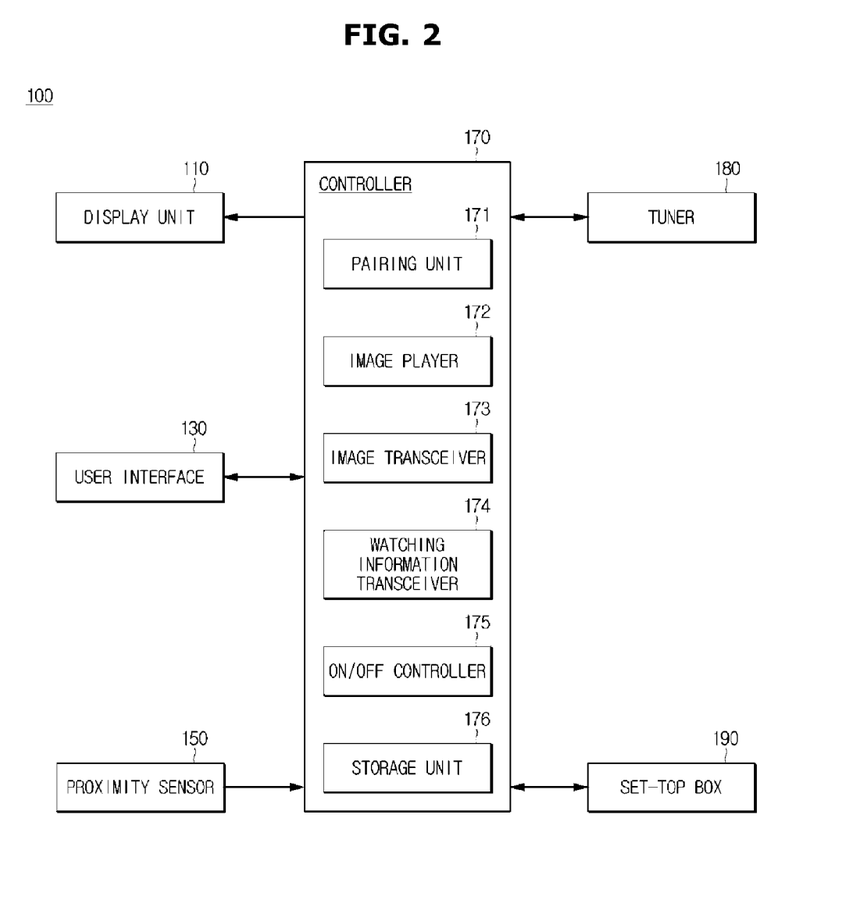
FIG. 2 is a block diagram illustrating a configuration of a main display in detail.

FIG. 2 is a block diagram illustrating a configuration of a main display in detail.

Hereinafter, it will be described with reference to FIG. 7 which is an exemplified view for describing a method of moving an image of a display device according to yet another embodiment.

As shown in FIG. 2, the main display 100 may include a display unit 110 for outputting information on an image and the main display 100, a user interface unit 130 for inputting control information and various types of information by a user, a proximity sensor 150 for detecting objects there around, a controller 170 for controlling an operation of the main display 100, a tuner 180, and a set-top box 190.

The above-described controller 170 may include a pairing unit 171, an image player 172, an image transceiver 173, a watching information transceiver 174, an on/off controller 175, and a storage unit 176.

The pairing unit 171 exchanges identifying information and performs a pairing procedure so that the main display 100 and the mobile display 200 are mutually recognized to transceive data there between. Even one pairing procedure is acceptable for transceiving data via an initial setting between the main display 100 and the mobile display 200, and the number of pairing procedures is not limited. When the initial setting is required again due to various reasons, such as a connection failure between the main display 100 and the mobile display 200, etc., the pairing procedure can be performed again.

The image player 172 may play a streaming image or a stored image and display the image on the display unit 110.

For example, the image player 172 may decode and output a streaming image transmitted from a broadcasting station server (not shown) through a communication network (not shown) in real time, or an image stored in the main display 100.

In more detail, the image player 172 may receive an external image transmitted through the tuner 180 or the set-top box 190. At this time, the tuner 180 is operated in a network using a quadrature amplitude modulation (QAM) method, an orthogonal frequency division multiplex (OFDM) method, a quadrature phase shift keying (QPSK) method, or the like. Here, the QAM method may mean a radio transmission system for cable broadcasting, the OFDM method may mean a radio transmission system for terrestrial broadcasting, and the QPSK method may mean a radio transmission system for satellite broadcasting. Further, the set-top box 190 may be defined as a configuration for receiving a digital signal and converting the digital signal into a signal capable of outputting from a display such as a television.

Further, after the image player 172 continuously displays an image playing therein on the mobile display 200, when the proximity sensor 150 detects that the mobile display 200 approaches the main display 100, the image being displayed on the mobile display 200 may be continued or displayed on the main display 100.

Figure 7:
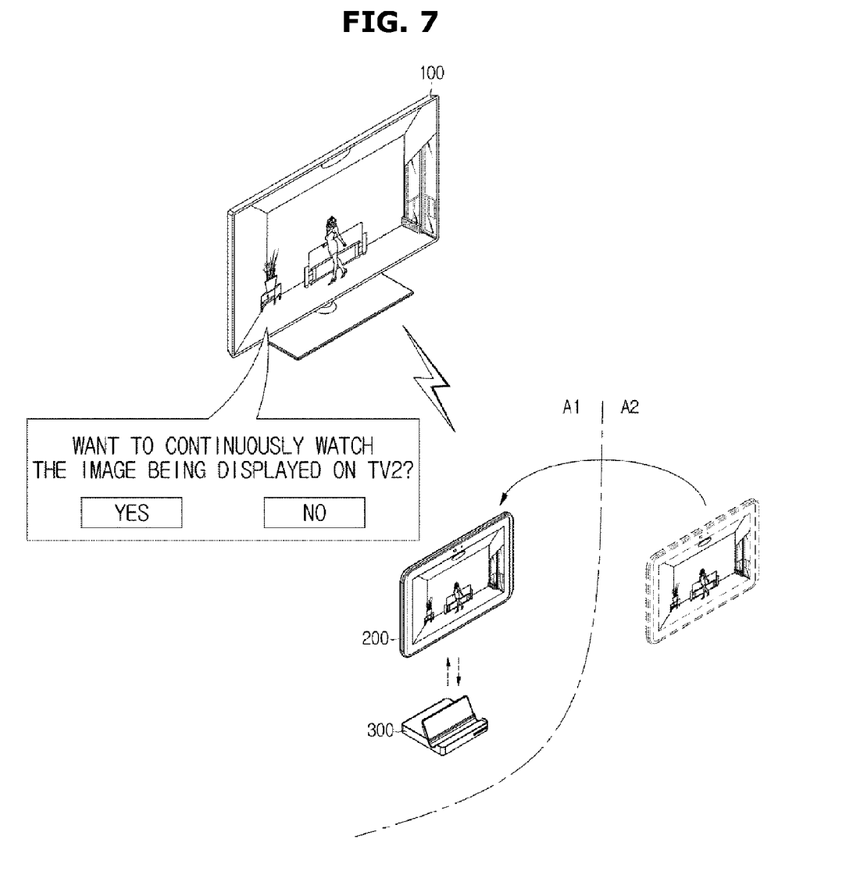
FIG. 7 is an exemplified view for describing a method of moving an image of a display device according to yet another embodiment.

For example, as shown in FIG. 1, according to movement of the mobile display 200 from the region A1 to the region A2, an image being displayed on the main display 100 is continued on the mobile display 200, and as shown in FIG. 7, according to movement of the mobile display 200 from the region A2 to the region A1, the image being displayed on the mobile display 200 is continued on the main display 100.

Further, the image player 172 continuously displays the image being displayed on the mobile display 200 on the main display 100, simultaneously outputs a query message for determining whether the image displaying the mobile display 200 may be continued or not, and then controls whether the image is continued or not according to user's selection.

This is a method for contacting the user to determine whether the image being displayed on the mobile display 200 is continued or not after the image being displayed on the mobile display 200 is first continued on the main display 100, and is for seamlessly and continuously watching the image being displayed on the mobile display 200 in view of the user.

For example, as shown in FIG. 7, the image player 172 may display an inquiry such as "Do you want to continuously watch the image being displayed on TV2 (the mobile display 200)?" and an icon for selecting any one of "Yes" and "No" on the display unit 110 through the user interface unit 130. The image player 172 may continuously play or stop the image being displayed through the display unit 110 according to "Yes" or "No" selected by the user.

The image transceiver 173 may transfer data of a current image being played by the image player 172 or a stored image to the paired mobile display 200. This is for seamlessly and continuously watching the image being displayed on the main display 100 on the mobile display 200 by transmitting the image data to the mobile display 200 in advance.

The watching information transceiver 174 may transmit image output information including at least one of a channel, volume, a current playback time, a playback position, and a combination thereof of an image being played through the image player 172 to the mobile display 200.

Hereinafter, it is assumed that data of the above-described image being displayed on the main display 100 and the image output information including at least one of the channel, the volume, the current playback time, the playback position, and the combination thereof of the image being displayed on the main display 100 are integrated as main image information. Here, the main image information is provided so that the mobile display 200 may find a playback time and environments of the image being displayed on the main display 100.

The on/off controller 175 may control power-on or power-off of the mobile display 200 and may also control various types of operations of the mobile display 200.

In more detail, after the on/off controller 175 continuously plays an image being displayed on the mobile display 200 through the image player 172, the on/off controller 175 outputs a message determining whether a screen of the mobile display 200 turns off or not, and may control the mobile display 200 according to user's selection. To control the above-described paired displays, it is necessary to perform an exchange of control information between the main display 100 and the mobile display 200 for controlling each other.

The storage unit 176 may store various types of information on the main display 100.

Figure 3:
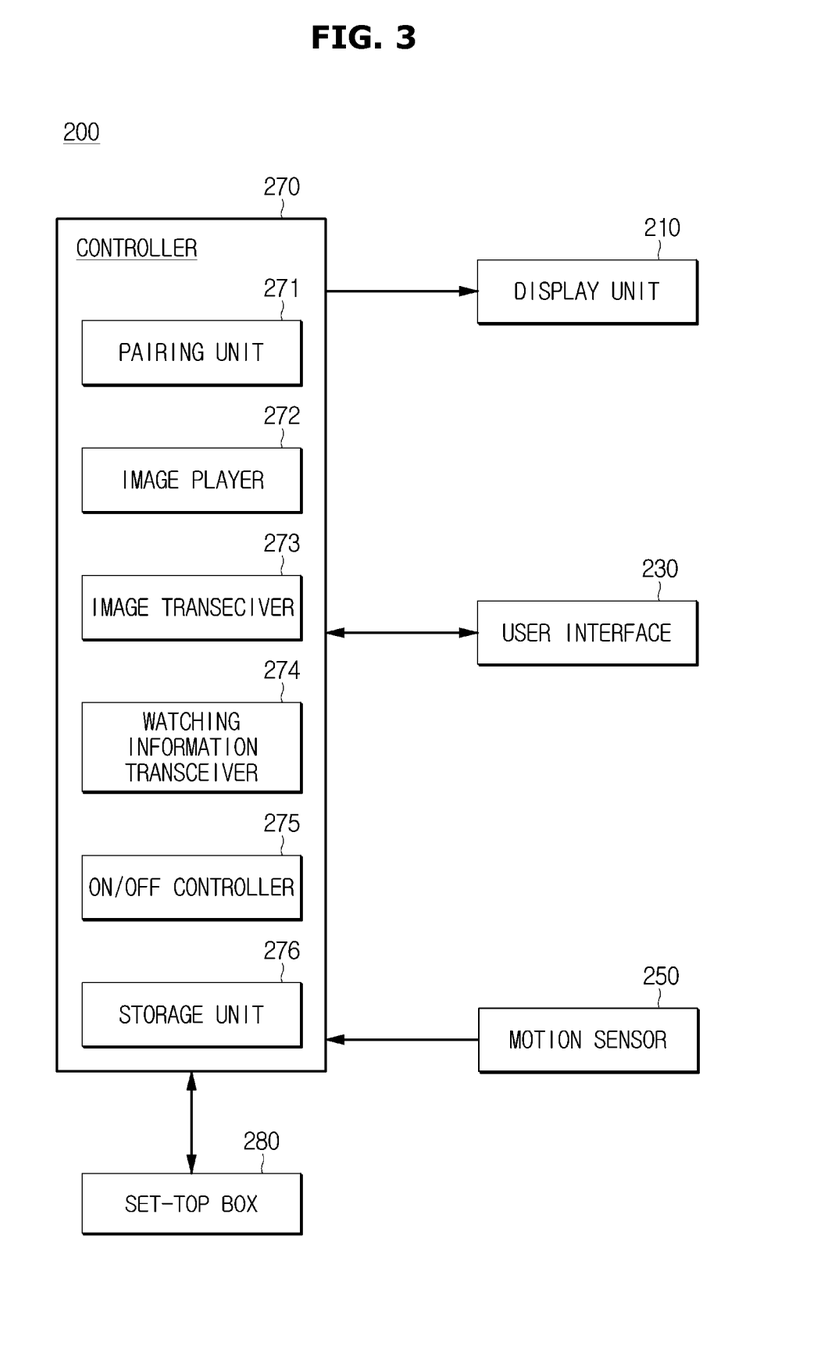
FIG. 3 is a block diagram illustrating a configuration of a mobile display in detail.

FIG. 3 is a block diagram illustrating a configuration of a mobile display in detail.

Hereinafter, it will be described with reference to FIG. 4 which is a view for describing a method of moving an image of a display device according to one embodiment, FIG. 5 which is an exemplified view for describing a method of moving an image of a display device according to another embodiment, and FIG. 6 which is an exemplified view for describing a method of moving an image of a display device according to still another embodiment.

As shown in FIG. 3, the mobile display 200 is paired and connected with the main display 100, receives and stores main image information transmitted from the main display 100, and when its own motion is detected, the mobile display 200 may continuously display an image being displayed on the main display 100 based on the main image information.

The above mobile display 200 may include a display unit 210 for outputting information on an image and the mobile display 200, a user interface unit 230 for inputting control information and various types of information by a user, a motion sensor 250 for detecting movement, and a controller 270 for controlling overall operations of the mobile display 200.

The above controller 270 may include a pairing unit 271, an image player 272, an image transceiver 273, a watching information transceiver 274, an on/off controller 275, and a storage unit 276.

The pairing unit 271 exchanges identifying information and performs a pairing procedure so that the main display 100 and the mobile display 200 are mutually recognized to transceive data there between. Even one pairing procedure is acceptable for transceiving data by initial setting between the main display 100 and the mobile display 200.

The image player 272 may play a streaming image or a stored image and display the image on the display unit 210.

Further, when the image player 272 detects its own motion through the motion sensor 250, an image being displayed on the main display 100 may be continued on the mobile display 200 based on the main image information.

At this time, when the image player 272 continuously plays the image, the image player 272 continuously displays the image being displayed on the main display 100 on the mobile display 200 based on a current playback time or playback position.

The main image information may include data of the image being displayed on the main display 100 and image output information including at least one of a channel, volume, the current playback time, the playback position, and a combination thereof of the image being displayed on the main display 100.

Further, the image player 272 may continuously display the image being displayed on the main display 100, simultaneously output a message for determining or querying whether the image displaying the main display 100 is continued or not, and control whether the image is continued or not according to user's selection.

That is, since the mobile display 200 inquires of the user for watching or not in a state in which the image being displayed on the main display 100 is continued in advance, a watching state of the main display 100 may be seamlessly maintained, and thus an unwatched image is not produced.

Figure 4:
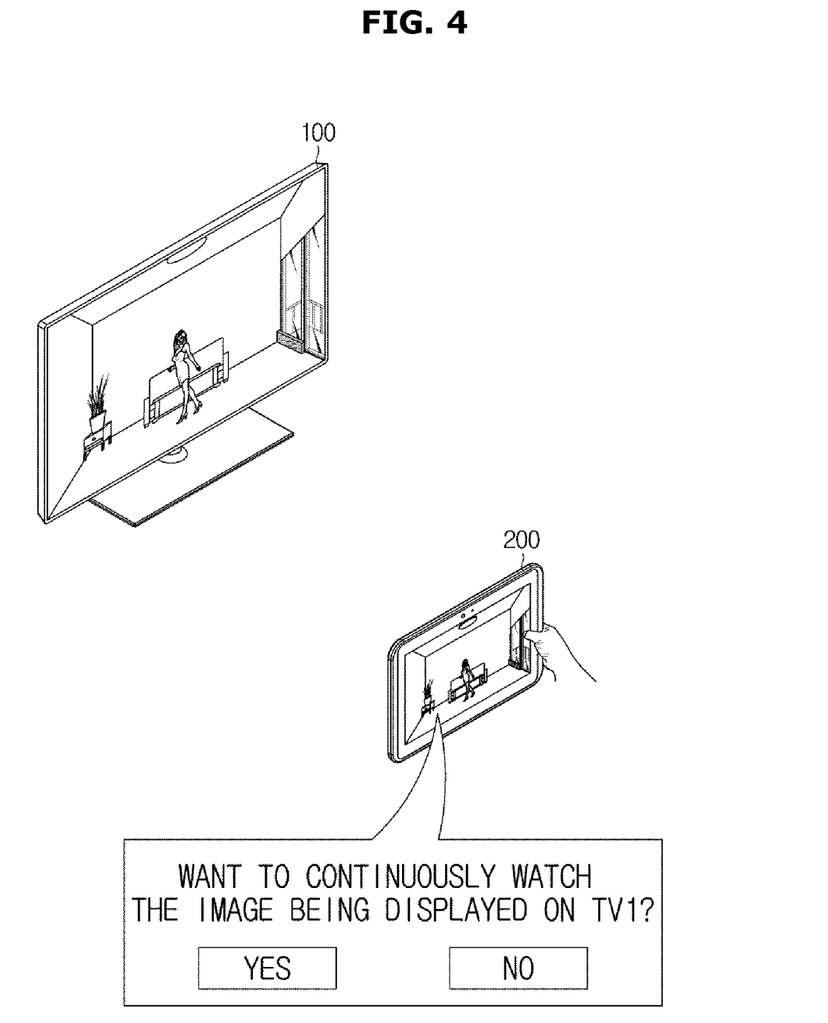
FIG. 4 is a view for describing a method of moving an image of a display device according to one embodiment.

For example, as shown in FIG. 4, the image player 272 may display an inquiry, such as "Do you want to continuously watch the image being displayed on TV1 (the main display 100)?," and an icon for selecting any one of "Yes" and "No" on the display unit 210 through the user interface unit 230. The image player 272 may continuously play or stop the image being displayed through the display unit 210 according to "Yes" or "No" selected by the user.

The image transceiver 273 may transfer data of a current image being played by the image player 272 or a stored image to the paired main display 100.

This is for seamlessly and continuously watching the image being displayed on the mobile display 200 on the main display 100 by transmitting the image data to the main display 100 in advance.

The watching information transceiver 274 may transmit image output information including at least one of a channel, volume, a current playback time, a playback position, and a combination thereof of an image being played through the image player 272 to the main display 100.

Hereinafter, it is assumed that data of the above-described image being displayed on the mobile display 200 and the image output information including at least one of the channel, the volume, the current playback time, the playback position, and the combination thereof of the image being displayed on the mobile display 200 are integrated as mobile image information.

The on/off controller 275 may control power-on or power-off of the main display 100 and may also control various types of operations of the main display 100. To perform the various types of operations of the main display 100, it is necessary that the mobile display 200 receives control information from the main display 100 in advance.

Figure 6:
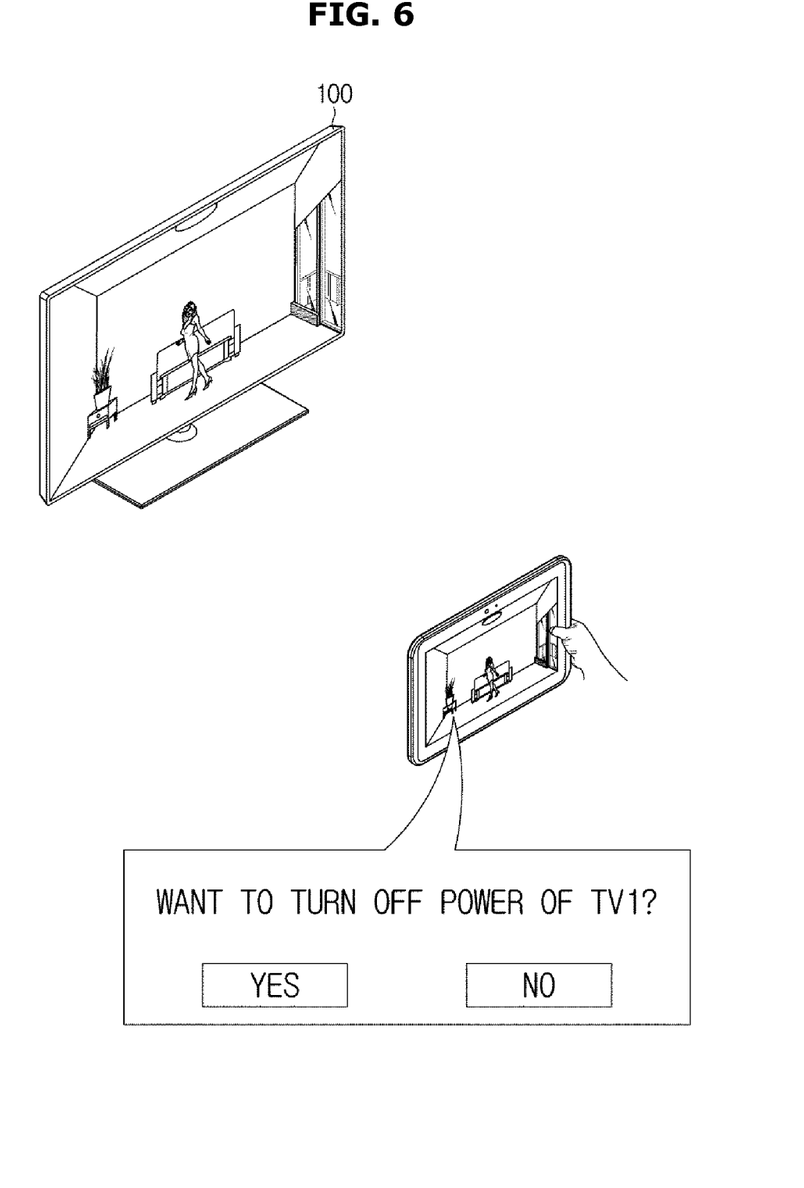
FIG. 6 is an exemplified view for describing a method of moving an image of a display device according to still another embodiment.

For example, as shown in FIG. 6, the on/off controller 275 may display an inquiry such as "Do you want to turn off TV1 (the main display 100)?" and an icon for selecting any one of "Yes" and "No" on the display unit 210. The on/off controller 275 may transmit control information for controlling a power source of the main display 100 to the main display 100 according to "Yes" or "No" selected by a user.

In more detail, after the on/off controller 275 continuously displays an image being displayed on the main display 100 through the image player 272, the on/off controller 275 may output a message for determining or querying whether a screen of the main display 100 turns off or not, and control the main display 100 according to user's selection.

Figure 5:
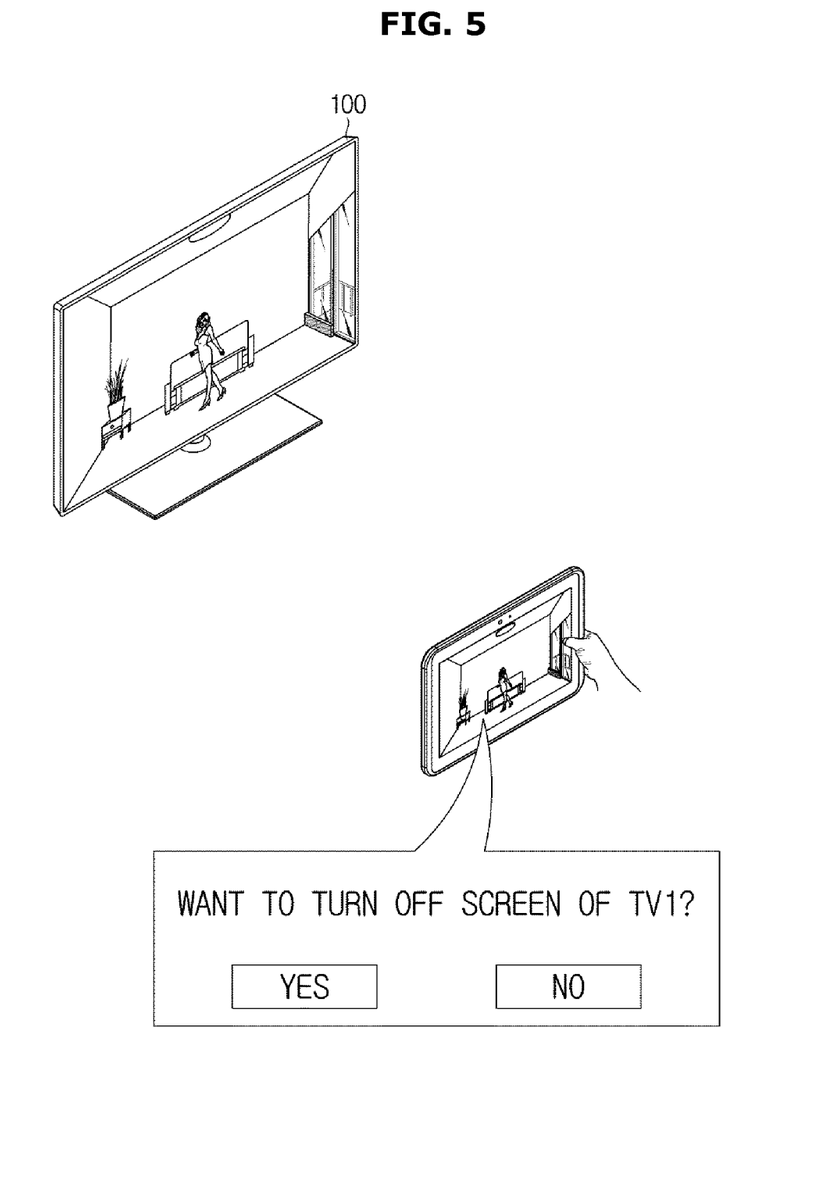
FIG. 5 is an exemplified view for describing a method of moving an image of a display device according to another embodiment.

For example, as shown in FIG. 5, the on/off controller 275 may output an inquiry such as "Do you want to turn off TV1 (the main display 100)?" and an icon for selecting any one of "Yes" and "No" on the display unit 210. The on/off controller 275 may transmit control information for controlling screen-on or screen-off of the main display 100 to the main display 100 according to "Yes" or "No" selected by a user.

The storage unit 276 may store various types of information on the mobile display 200.

For example, the storage unit 276 may store data of a playing image transmitted from the main display 100 and main image information including at least one of a channel, volume, a current playback time, a playback position, and a combination thereof of the playing image.

Meanwhile, as shown in FIG. 1, the display device may further include a docking station 300 for mounting the mobile display 200. Here, the docking station 300 may be provided so that the mobile display 200 may use an expansion slot, and external memory device, a network interface card capable of connecting to a local area network (LAN), etc., or may provide a battery charging function for the mobile display 200, but the docking station 300 is not limited thereto.

A case in which the mobile display 200 is separated from the docking station 300 in a state of connection through connection terminals there between may be recognized as motion detection. That is, when the mobile display 200 is separated from the docking station 300 in a state of mounting on the docking station 300, this is recognized as a motion and an image being displayed on the main display 100 may be continued on the mobile display 200.

On the contrary, when the mobile display 200 is switched from a state separated from the docking station 300 to a state of mounting on the docking station 300, a method of continuously displaying the image being displayed on the mobile display 200 on the main display 100 may be possible.

Figure 8:
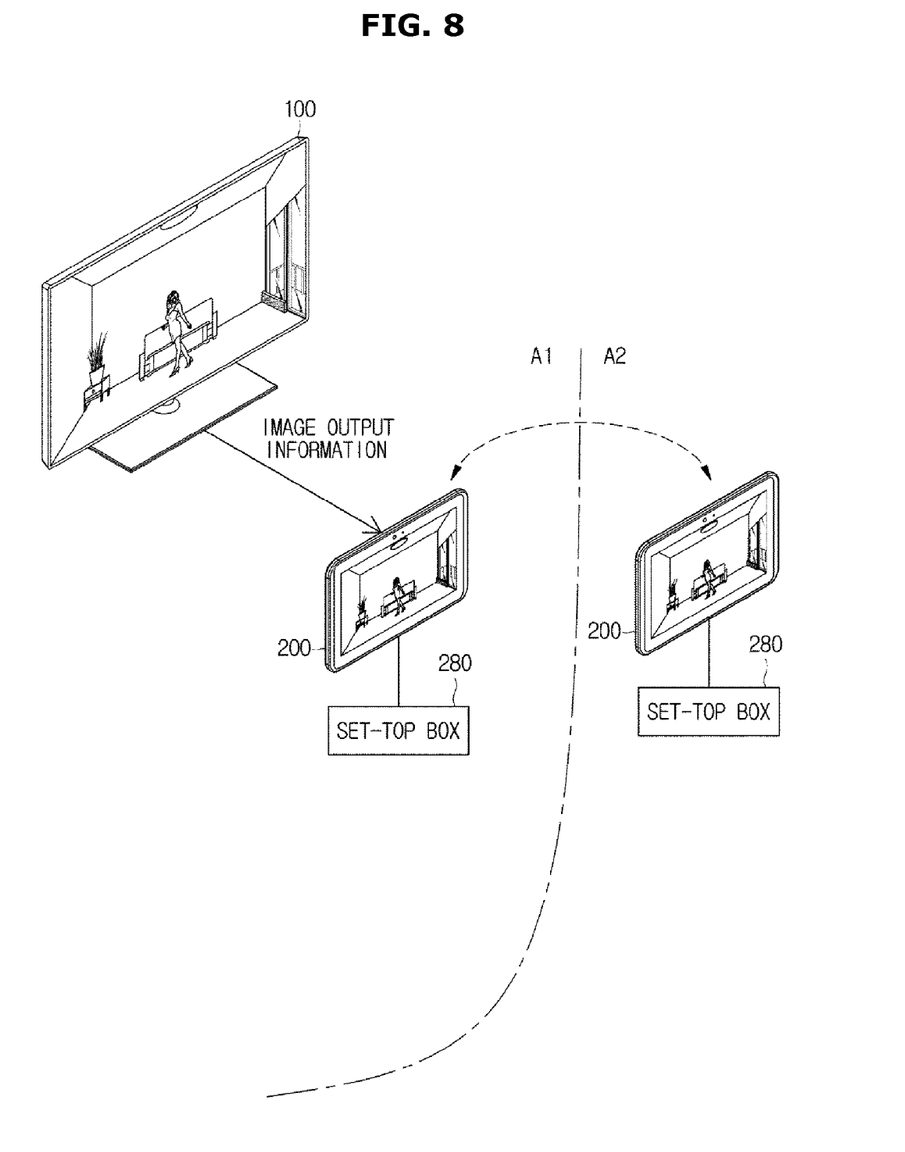
FIG. 8 is an exemplified view for describing a method of transceiving image information for image movement between a main display and a mobile display.

Meanwhile, the mobile display 200 may include a set-top box 280, and in this case, the main display 100 may transmit only image output information to the mobile display 200.

For example, as shown in FIG. 8, when the mobile display 200 includes the set-top box 280, the mobile display 200 may directly receive an image by itself, and thus the main display 100 may transmit only image output information including at least one of a channel, volume, a current playback time, a playback position, and a combination thereof of an image being displayed thereon to the mobile display 200.

Figure 9:
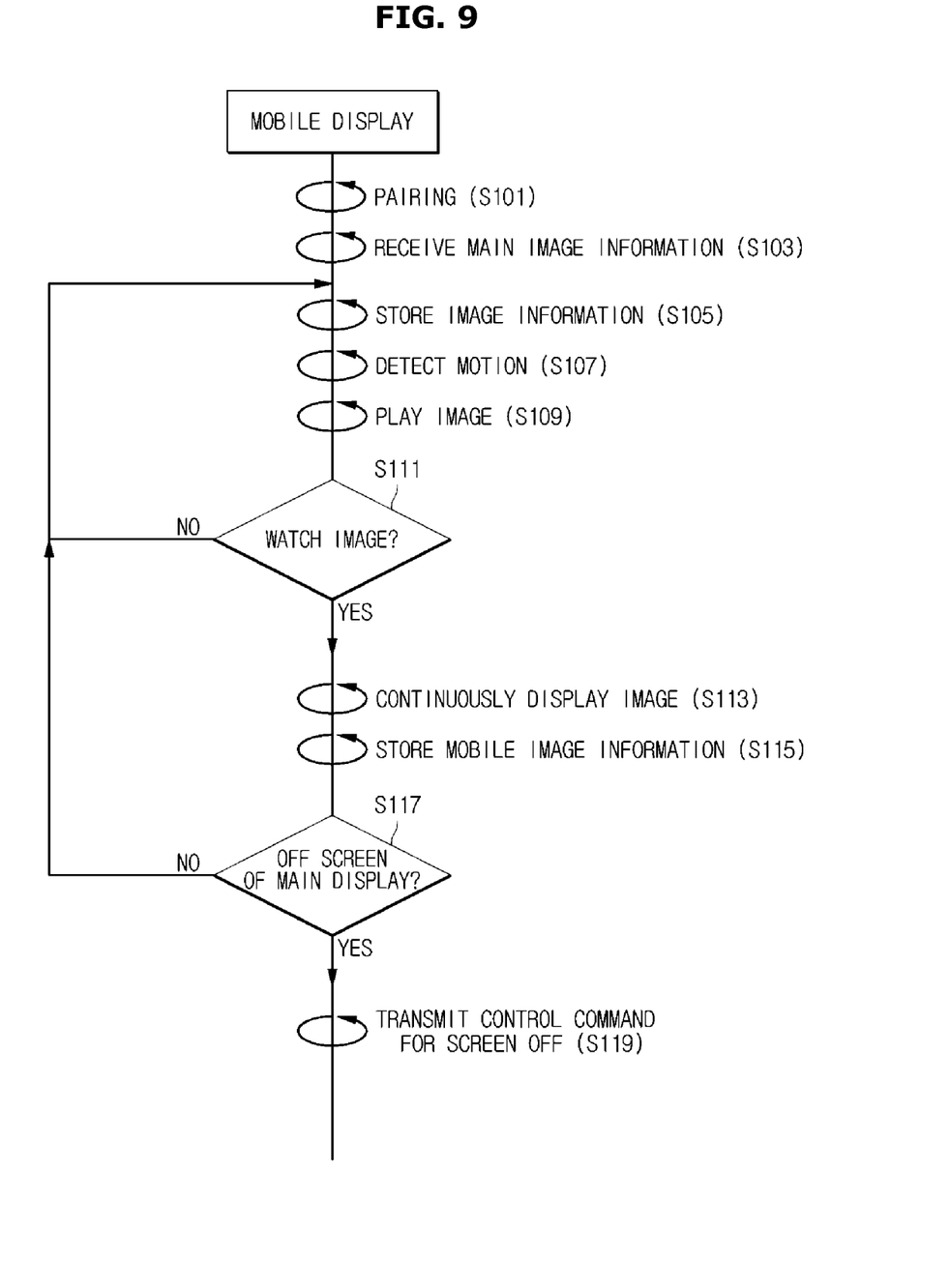
FIG. 9 is a flowchart for describing a method of moving an image of a display device according to one embodiment.

FIG. 9 is a flowchart for describing a method of moving an image of a display device according to one embodiment, and an example of a case in which an image being displayed on a main display is continued on a mobile display will be described.

First, the mobile display 200 and the main display 100 are recognized by each other and exchange identifying information and a pairing procedure to transceive data (S101).

Next, the mobile display 200 may receive data of a current playing image or a stored image and main image information including image output information having at least one of a channel, volume, a current playback time, a playback position, and a combination thereof of an image being displayed on the main display 100 from the main display 100 (S103). This is for transmitting the main image information from the main display 100 to the mobile display 200 in advance so that the image being watched on the main display 100 is seamlessly continued on the mobile display 200.

Next, the mobile display 200 receives and stores the main image information transmitted from the main display 100, and when its own motion is detected, the image being displayed on the main display 100 may be continued on mobile display 200 based on the main image information (S105 to S109).

Next, the mobile display 200 continuously displays the image being displayed on the main display 100 and simultaneously outputs an message determining whether the image being displayed on the main display 100 is continued or not, and when a user selects "Yes", the image may be continuously displayed (S111 and S113).

For example, as shown in FIG. 4, the mobile display 200 may display an inquiry such as "Do you want to continuously watch the image being displayed on TV1 (the main display 100)?" and an icon for selecting any one of "Yes" and "No" on the display unit 210. The mobile display 200 may continuously display or stop the image output through the display unit 210 according to "Yes" or "No" selected by the user.

That is, since the mobile display 200 inquires of the user for watching or not in a state in which the image being displayed on the main display 100 is displayed in advance, a watching state of the main display 100 may be seamlessly maintained, and thus, an unwatched image is not produced.

Meanwhile, a method of outputting a message for continuing or not after an image is continued on the mobile display 200 in advance may be changeable according to the necessity of an operator.

Next, the mobile display 200 may transfer mobile image information including image output information having at least one of a channel, volume, a current playback time, a playback position, and a combination thereof of the image being displayed thereon to the paired main display 100 (S115).

Although not shown, the main display 100 may store the mobile image information transmitted from the mobile display 200.

Meanwhile, the mobile display 200 continuously displays the image being displayed on the main display 100, and then may output a message determining whether a screen of the main display 100 turns off or not (S117).

For example, as shown in FIG. 5, the mobile display 200 may output an inquiry such as "Do you want to turn off TV1 (the main display 100)?" and an icon for selecting any one of "Yes" and "No" on the display unit 210. The mobile display 200 may transmit control information for controlling screen-on or screen-off of the main display 100 to the main display 100 according to "Yes" or "No" selected by the user.

When the user selects the screen-off, the mobile display 200 may transmit a control command for the screen-off to the main display 100 (S119).

Although not shown, the main display 100 may turn off a screen according to the control command for the screen-off transmitted from the mobile display 200, and to this end, control information may be transceived between the mobile display 200 and the main display 100 in advance.

Figure 10:
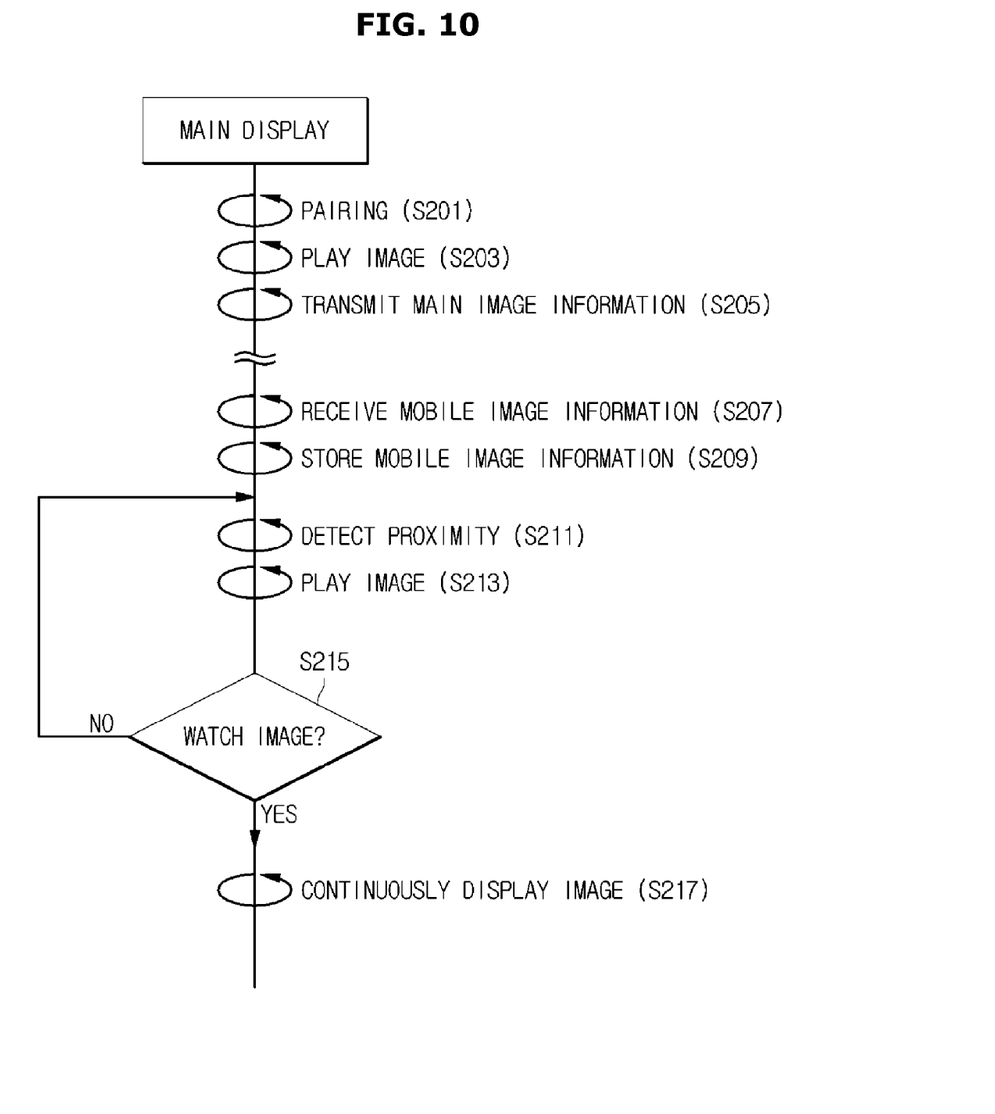
FIG. 10 is a flowchart for describing a method of moving an image of a display device according to another embodiment.

FIG. 10 is a flowchart for describing a method of moving an image of a display device according to another embodiment, and an example of a case in which an image being displayed on a mobile display is continued on a main display will be described.

First, the main display 100 and the mobile display 200 are recognized by each other and perform an exchange of identifying information and a pairing procedure to transceive data (S201).

Next, the main display 100 plays a streaming image or stored image and displays the image on the display unit 110 (S203).

Next, the main display 100 may transfer data of a current playing image or a stored image and main image information including image output information having at least one of a channel, volume, a current playback time, a playback position, and a combination thereof of the image being displayed thereon to the paired mobile display 200 (S205). This is for seamlessly and continuously watching the image being displayed on the main display 100 on the mobile display 200 by transmitting the image data to the mobile display 200 in advance.

Meanwhile, when the image being displayed on the main display 100 is displayed on the mobile display 200 due to movement of the mobile display 200, the main display 100 may receive and store the mobile image information transmitted from the mobile display 200 (S207 and S209). Here, the mobile image information may include image output information including at least one of a channel, volume, a current playback time, a playback position, and a combination thereof of the image being displayed on the mobile display 200.

When the mobile display 200 approaches the main display 100, the main display 100 may detect the mobile display 200 through the proximity sensor 150 (S211).

Next, the main display 100 may continuously display the image being displayed on the mobile display 200 (S213).

Next, the main display 100 outputs a message determining whether the image being displayed on the mobile display 200 may be continued or not (S215), and when a user requests continuously displaying the image, the image may be continued without interruption (S217).

For example, as shown in FIG. 7, the main display 100 may display an inquiry such as "Do you want to continuously watch the image being displayed on TV2 (the mobile display 200)?" and an icon for selecting any one of "Yes" and "No" on the display unit 110. The main display 100 may continuously display or stop the image output through the display unit 110 according to "Yes" or "No" selected by the user.

As is apparent from the above description, display devices can seamlessly and continuously display the image there between in an environment using a mounting type main display and a mobile display.

In the drawings and specification, there have been disclosed typical exemplary embodiments, and although specific terms are employed, they are used in a generic and descriptive sense only and not for purposes of limitation. In addition, it will be clearly understood by those of ordinary skill in the art that various changes in form and details may be made therein without departing from the spirit and scope of the embodiments.

Simple modifications or variations belonging to the equivalent of the scope of the claims and the instructions disclosed herein for a patent are all within the scope of the embodiments, and the detailed scope of the protection will be clearly understood by the attached claims.

What is claimed is:

1. A display device, comprising:
a mobile display which includes a motion sensor for detecting movement, is paired and connected with a main display, receives and stores main image information transmitted from the main display, and when mobile display motion is detected, continuously displays an image being displayed on the main display based on the main image information,
wherein the mobile display recognizes motion detection when any one of a change of mobile display position, image sway, a change in ambient sound, and a combination thereof is detected through the motion sensor,
wherein the main image information includes data of the image being displayed on the main display and image output information having at least one of a channel, volume, a current playback time, a playback position, and a combination thereof of the image being displayed on the main display,
wherein the mobile display continuously displays the image being displayed on the main display based on one of the current playback time and the playback position when the image is continuously displayed.

2. The display device according to claim 1, wherein the mobile display continuously displays the image being displayed on the main display, simultaneously outputs a message querying whether the image being displayed on the main display is to be continuously displayed, and controls whether the image is to be continued according to user selection.

3. The display device according to claim 1, wherein the mobile display includes an on/off controller which outputs a message querying whether a screen of the main display is to be off after the image being displayed on the main display is continued, and controls the main display according to user selection.

4. The display device according to claim 1, wherein the mobile display includes a watching information transceiver which transmits mobile image information including at least one of a channel, volume, a current playback time, a playback position, and a combination thereof of a current image being displayed on the mobile display to the main display.

5. The display device according to claim 1, further comprising a docking station configured to mount the mobile display,
wherein a situation in which the mobile display is separated from the docking station in a state connected through connection terminals there between is recognized as the motion detection.

* * * * *